(12) United States Patent
Reynolds et al.

(10) Patent No.: US 6,500,364 B2
(45) Date of Patent: Dec. 31, 2002

(54) NONLINEAR OPTICAL (NLO) BERYLLATE MATERIALS

(75) Inventors: Thomas A. Reynolds, Bend, OR (US); Theodore Alekel, Bend, OR (US); Douglas A. Keszler, Corvallis, OR (US)

(73) Assignee: ReyTech Corporation, Bend, OR (US)

( * ) Notice: Subject to any disclaimer, the term of this patent is extended or adjusted under 35 U.S.C. 154(b) by 82 days.

(21) Appl. No.: 09/803,822

(22) Filed: Mar. 12, 2001

(65) Prior Publication Data

US 2002/0166997 A1 Nov. 14, 2002

(51) Int. Cl.$^7$ .............. G02B 5/20; C01F 3/00; G02F 1/35
(52) U.S. Cl. .......... 252/584; 423/115; 423/134; 423/593; 423/594; 423/595; 423/596; 423/624; 359/328
(58) Field of Search ................. 252/584, 582; 423/115, 134, 593, 594, 595, 596, 624; 359/326, 328

(56) References Cited

U.S. PATENT DOCUMENTS 5,523,026 A * 6/1996 Chen et al. .............. 252/584
6,417,954 B1 * 7/2002 Reynolds et al. ......... 252/584

OTHER PUBLICATIONS

Kastner et al., Zur Kenntnis Der Oxoberyllate Der Alkalimetalle, Z. Anorg. Allg. Chem., vol. 415, No. 3, pp. 249–253, (1975).*

Jansen, M., Naturwissenschaften, vol. 62, No. 5, pp. 236–237, (1975).*

* cited by examiner

Primary Examiner—Philip Tucker
(74) Attorney, Agent, or Firm—The Halvorson Law Firm

(57) ABSTRACT

In one embodiment of the present invention, the material is a non-linear optical compound with a general chemical formula $$(\Sigma_i M_{\alpha i}^1)(\Sigma_j M_{\beta j}^2)(\Sigma_k M_{\gamma k}^3)Be_2O_5 \quad \text{Formula 1}$$

wherein $M^1$, $M^2$, and $M^3$ are mono-, di-, or tri-valent metal ions respectively; wherein $(\Sigma_i \beta_i)=X$ and ranges from 0 to 6, $(\Sigma_j \beta_j)=Y$ and ranges from 0 to 3, and $(\Sigma_k \gamma_k)=Z$ and ranges from 0 to 2, (hereinafter referred to as "$MBE_2O_5$" compounds). Another embodiment of the present invention satisfies the generally formula $$(\Sigma_i M_{\alpha i}^1)Be_2O_5 \quad \text{Formula 2}$$

wherein $M^1$ is a mono-valent metal ion; and wherein $(\Sigma_i \alpha_i)=X=6$; and yet another embodiment of the present invention satisfies the general formula $$(\Sigma_{j=1-3} M_{\beta j}^2)Be_2O_5 \quad \text{Formula 3}$$

wherein $M^2$ is a di-valent metal ion; and wherein $(\Sigma_j \beta_j)=Y=3$, another embodiment of the present invention satisfies the general formula $$(\Sigma_k M_{\gamma k}^3)Be_2O_5 \quad \text{Formula 4}$$

wherein $M^3$ is a tri-valent metal ion; and wherein $(\Sigma_k \gamma_k)=Z=2$. Mono- and di-valent metal ions, $M^1$ and $M^2$, that are suitable for forming compounds satisfying the general formula are preferably independently selected from the group consisting of Groups IA and IIA, however other mono- and di-valent cations may be used so long as the material has a non-centrosymmetric arrangement.

24 Claims, 1 Drawing Sheet

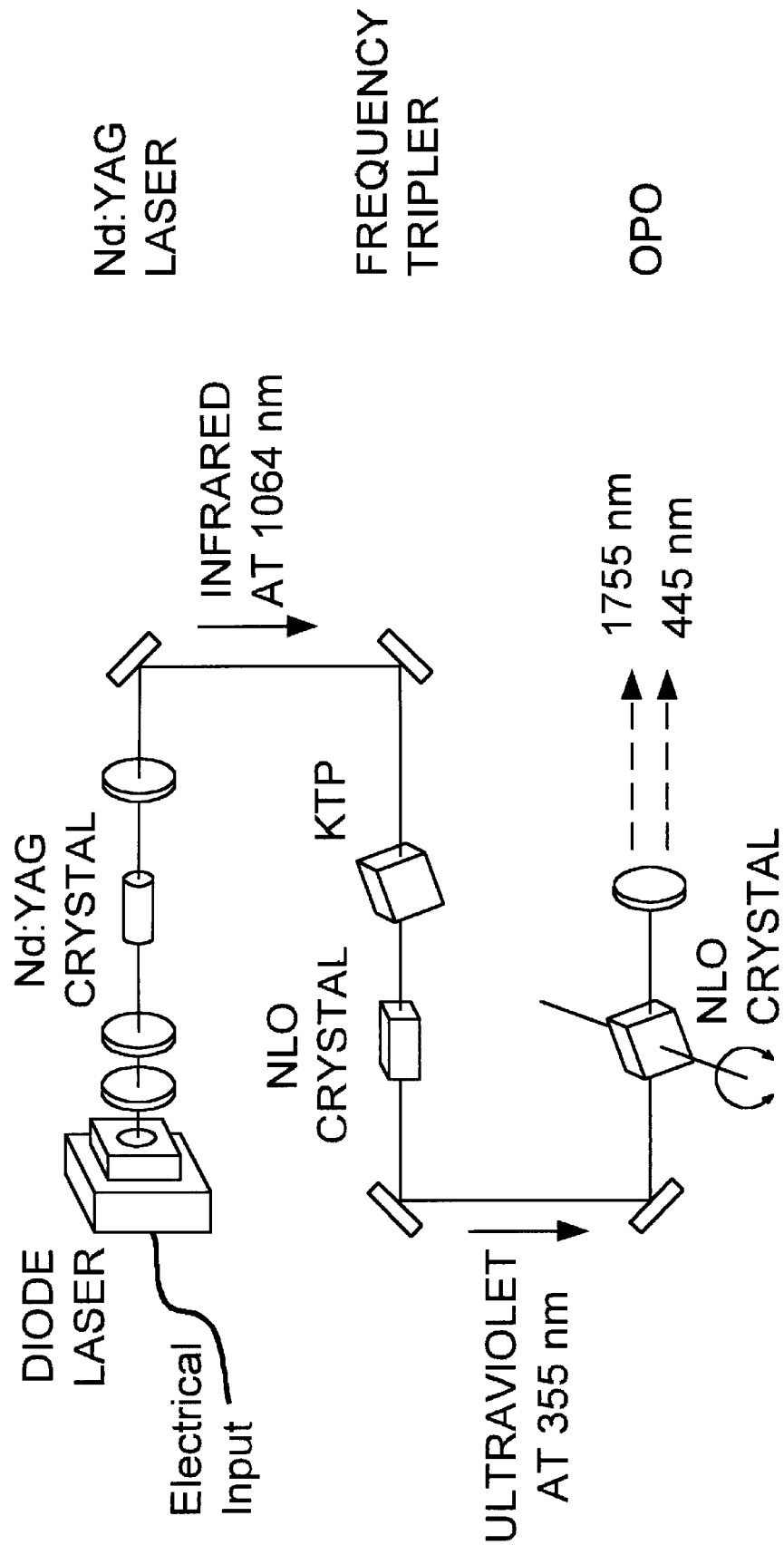

NONLINEAR OPTICAL (NLO) BERYLLATE MATERIALS

FIELD OF THE INVENTION

The field of the invention relates to materials that are non-linear optical compounds with a general chemical formula $$(\Sigma_i M_{\alpha i}^1)(\Sigma_j M_{\beta j}^2)(\Sigma_k M_{\gamma k}^3)Be_2O_5 \qquad \text{Formula 1}$$

wherein $M^1$, $M^2$, and $M^3$ are mono-, di-, or tri-valent metal ions respectively; wherein $(\Sigma_i \alpha_i)=X$ and ranges from 0 to 6, $(\Sigma_j \beta_j)=Y$ and ranges from 0 to 3, and $(\Sigma_k \gamma_k)=Z$ and ranges from 0 to 2, (hereinafter referred to as "MBe$_2$O$_5$" compounds). Another embodiment of the present invention satisfies the generally formula $$(\Sigma_i M_{\alpha i}^1)Be_2O_5 \qquad \text{Formula 2}$$

wherein $M^1$ is a mono-valent metal ion; and wherein $(\Sigma_i \alpha_i)= X=6$; and yet another embodiment of the present invention satisfies the general formula $$(\Sigma_{j=1-3} M_{\beta j}^2)Be_2O_5 \qquad \text{Formula 3}$$

wherein $M^2$ is a di-valent metal ion; and wherein $(\Sigma_j \beta_j)= Y=3$, another embodiment of the present invention satisfies the general formula $$(\Sigma_k M_{\gamma k}^3)Be_2O_5 \qquad \text{Formula 4}$$

wherein $M^3$ is a tri-valent metal ion; and wherein $(\Sigma_k \gamma_k)= Z=2$. Mono- and di-valent metal ions, $M^1$ and $M^2$, that are suitable for forming compounds satisfying the general formula are preferably independently selected from the group consisting of Groups IA and IIA, however other mono- and di-valent cations may be used so long as the material has a non-centrosymmetric atomic arrangement, (hereinafter referred to as "MBE$_2$O$_5$" compounds).

BACKGROUND OF THE INVENTION

Nonlinear optical (NLO) materials are unusual in that they affect the properties of light. A well-known example is the polarization of light by certain materials, such as when materials rotate the polarization vectors of absorbed light. If the effect on the polarization vector by the absorbed light is linear, then light emitted by the material has the same frequency as the absorbed light. NLO materials affect the polarization vector of the absorbed light in a nonlinear manner. As a result, the frequency of the light emitted by a nonlinear optical material is affected.

More specifically, when a beam of coherent light of a given frequency, such as produced by a laser, propagates through a properly oriented NLO crystal having non-zero components of the second order polarizability tensor, the crystal will generate light at a different frequency, thus extending the useful frequency range of the laser. Generation of this light can be ascribed to processes such as sum-frequency generation (SFG), difference-frequency generation (DFG) and optical parametric amplification (OPA). Devices using NLO crystals include, but are not limited to, up and down frequency converters, optical parametric oscillators, optical rectifiers, and optical switches.

Frequency generation in NLO materials is an important effect. For example, two monochromatic electromagnetic waves with frequencies $\omega_1$ and $\omega_2$ propagating through a properly oriented NLO crystal can result in generation of light at a variety of frequencies. Mechanisms defining the frequency of light using these two separate frequencies are sum-frequency generation and difference-frequency generation. SFG is a process where light of frequency $\omega_3$ is generated as the sum of the two incident frequencies, $\omega_3=\omega_1+\omega_2$. In other words, SFG is useful for converting long wavelength light to shorter wavelength light (e.g. near infrared to visible, or visible to ultraviolet). A special case of sum-frequency generation is second-harmonic generation (SHG) where $\omega_3=2\omega_1$, which is satisfied when the incident frequencies are equal, $\omega_1=\omega_2$. DFG is a process where light of frequency $\omega_4$ is generated as the difference of the incident frequencies $\omega_4=\omega_1-\omega_2$. DFG is useful for converting shorter wavelength light to longer wavelength light (e.g. visible to infrared). A special case of DFG is when $\omega_1=\omega_2$, hence $\omega_4=0$, which is known as optical rectification. Optical parametric oscillation is also a form of DFG and is used to produce light at tunable frequencies.

The conversion efficiency of an NLO crystal for a particular application is dependent on a number of factors that include, but are not limited to: the effective nonlinearity of the crystal (picometers/volt [pm/V]), birefringence ($\Delta n$, where n is a refractive index), phase-matching conditions (Type I, Type II, non-critical, quasi, or critical), angular acceptance angle (radian·cm), temperature acceptance (° C.·cm), walk-off (radian), temperature dependent change in refractive index (dn/dt), optical transparency range (nm), and the optical damage threshold (W/cm$^2$). Desirable NLO crystals should posses an optimum combination of the above properties as defined by the specific application.

Borate crystals form a large group of inorganic NLO materials used in laser-based manufacturing, medicine, hardware and instrumentation, communications, and research studies. Beta barium borate (BBO: $\beta$-BaB$_2$O$_4$), lithium triborate (LBO: LiB$_3$O$_5$), and cesium lithium borate (CLBO:CsLi(B$_3$O$_5$)$_2$) are examples of borate-based NLO crystals developed in recent years that are being used widely as NLO devices, especially in high power applications. Select properties suitable for generation of laser light from the mid-infrared (IR) to the ultraviolet (UV) for these crystals are listed in Table 1.

TABLE 1

Commercially Available NLO Materials and Properties

| PROPERTY | BBO | LBO | CLBO |
|---|---|---|---|
| $d_{eff}$ (pm/V) | 2 | 0.8 | 2.2–3.2 |
| Optical Transmission (nm) | 2600–190 | 2600–160 | 1700–180 |
| Angular Acceptance (mrad · cm) | 1.0 | 7 | 1.7 |
| Temperature Acceptance (K · cm) | 55 | 7.5 | 2.5 |
| Walk-off Angle (mrad) | 56 | 6.5 | 16 |
| Damage Threshold (10$^9$ W/cm$^2$) | 15 | 25 | 25 |
| Crystal Growth Properties | flux or congruent melt | flux | congruent melt |

BBO has a favorable non-linearity (about 2 pm/V), transparency between 2600 nm and 190 nm, significant birefringence (necessary for phase-matching), and a high damage threshold (15 GW/cm$^2$, 1064 nm, 0.1 ns pulse width). However, its high birefringence creates a relatively small angular acceptance and a large walk-off angle that can limit conversion efficiencies. The crystal is relatively difficult to produce in large sizes and is somewhat hygroscopic.

LBO has good UV transparency (absorption edge=160 nm) and possesses a high damage threshold (25 GW/cm$^2$, 0.1 ns, 1064 nm). However, it has insufficient intrinsic birefringence for phase-matching to generate deep UV radiation. Furthermore, LBO melts incongruently and must be prepared by flux-assisted crystal growth methods. This limits production efficiency that leads to small crystals and higher production costs.

CLBO appears to be a very promising material for high power production of UV light due to a combination of high nonlinearity and high damage threshold. The crystal can also be manufactured to relatively large dimensions. Unfortunately, the crystal is exceedingly hygroscopic and invariably sorbs water from the air; hence, extreme care must be taken to manage environmental moisture to prevent hydration stresses and possible crystal destruction.

With so many intrinsic physical parameters to optimize, known optical frequency converters, at present, are applicable to specific applications. A major factor limiting the advancement of laser applications is the inability of conventional NLO devices to generate laser light at desired wavelengths, power levels, and beam qualities. Currently-available NLO materials are not able to meet specifications required by many applications due to a number of factors that include: small nonlinear coefficients, bulk absorption in energy regions of interest, poor optical clarity, low damage thresholds, instability under operation, environmental degradation, difficulty in device integration, and high cost of manufacture. In many cases, the fundamental limit of conventional NLO materials has been met, and as a result, they are not able to meet specifications required by many present and future applications. Related properties and shortcomings are discussed in Chemistry of Materials, 1:492–508 (1989), Keszler, Curr. Opinion in Solid State & Mater. Sci. 1, 204 (1996); Becker Adv. Mater. 10(13) p. 979–992 (1998), which are hereby incorporated by reference.

At present, there are two UV NLO materials, one is β-BaB$_2$O$_4$ (BBO), and the other KBe$_2$BO$_3$F$_2$ (KBBF). BBO crystal has a planar (B$_3$O$_6$) group as the basic structure unit, and therefore, there is a conjugate π orbital of non-symmetry in the valent orbitals of the structure that produces a high microscopic second-order susceptibility. The d$_{22}$ coefficient, a major macroscopic NLO coefficient of BBO, is less than or equals to 2.7 pm/v, which is the highest in the ultraviolet NLO crystals currently known. However, there are shortcomings for BBO as an UV NLO crystal, some of which are listed below.

(1) The band gap of the structure is narrow so that the absorption edge of the crystal is about 189 nm, compared to about 170 nm for LBO. When BBO is used to produce a harmonic generation output in ranges from 200 nm to 300 nm, absorption is greatly enhanced compared to the visible range. This is why the crystal is easy damaged when used to produce a fourth harmonic generation with high fundamental optical power. In addition, owing to partial absorption of the quadruple frequency, the rise of temperature in irradiated crystals is inhomogeneous, which leads to a local change of refractive index and greatly falling of optical quality of the harmonic generation output;

(2) The birefringence of BBO Δn≅0.12, which is also related to the planar structure of B$_3$O$_6$ group arranged in the crystal lattice. This large birefringence of BBO makes the acceptance angle and walk-off ange at the frequency of quadruple multiplication to be too small (Δθ=0.45 mrad) to suit for device applications.

One possible way to overcome the above shortcomings of BBO by replacing the active NLO group B$_3$O$_6$ with BO$_3$. The three oxygen terminals of BO$_3$ should simultaneously bridge other atoms with the absorption edge shifting toward the blue side of spectrum, in the range of 150–160 nm. It is also possible for such a compound to reduce the birefringence, which favors an increased acceptance angle of the crystal. Based on these considerations KBe$_2$BO$_3$F$_2$ (KBBF) was developed, with an absorption edge reaching 155 nm, birefringence down to about 0.7, and the phase-matchable range extending to 185 nm. However KBBF is difficult to grow because of the strong layer structure of the crystal lattice (the crystal appearance is similar to mica, with a severe cleavage at (001) plane of the lattice). This limits KBBF as a practical NLO material.

Because of the large number and diversity of present and projected applications, no single NLO material can be optimized for all uses. Thus far only a limited number of efficient NLO materials have been commercialized, thereby creating a bottleneck in the use of lasers in the advancement of many key technology areas. As a result, there is a continuing search for and development of new NLO materials.

SUMMARY OF THE INVENTION

It is an object of the present invention to produce and utilize nonlinear optical materials that satisfy the general formula

  Formula 1 wherein M$^1$, M$^2$, and M$^3$ are mono-, di-, or tri-valent metal ions respectively; wherein ($\Sigma_i\alpha_i$)=X and ranges from 0 to 6, ($\Sigma_j\beta_j$)=Y and ranges from 0 to 3, and ($\Sigma_k\gamma_k$)=Z and ranges from 0 to 2, (hereinafter referred to as "MBe$_2$O$_5$" compounds).

Another object of the present invention is to produce a non-linear optical compound that satisfies the generally formula

  Formula 2 wherein M$^1$ is a mono-valent metal ion; and wherein ($\Sigma_i\alpha_i$)=X=6

Still yet another object of the present invention is to produce a non-linear optical compound that satisfies the generally formula

  Formula 3 wherein M$^2$ is a di-valent metal ion; and wherein ($\Sigma_j\beta_j$)=Y=3.

A further object of the present invention is to produce a non-linear optical compound that satisfies the generally formula

  Formula 4 wherein M$^3$ is a tri-valent metal ion; and wherein ($\Sigma_k\gamma_k$)=Z=2.

The novel features that are considered characteristic of the invention are set forth with particularity in the appended claims. The invention itself, however, both as to its structure and its operation together with the additional objects and advantages thereof, will best be understood from the following description of the preferred embodiment of the present invention when read in conjunction with the accompanying drawing. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

FIG. 1 is a schematic diagram illustrating an optical system that might use the nonlinear optical materials of the present invention.

DETAILED DESCRIPTION OF THE PREFERRED EMBODIMENTS

The present invention provides nonlinear optical materials that can be used for a number of optical applications include, but are not limited to, harmonic generation (HG), sum-frequency generation (SFG), difference-frequency generation (DFG) and optical parametric oscillation (OPO). The following paragraphs describe the nonlinear optical materials, as well as how to make and use the compounds.

I. Description of NLO Materials

In one embodiment of the present invention, the material is a non-linear optical compound with a general chemical formula

  Formula 1 wherein $M^1$, $M^2$, and $M^3$ are mono-, di-, or tri-valent metal ions respectively; wherein $(\Sigma_i \alpha_i)=X$ and ranges from 0 to 6, $(\Sigma_j \beta_j)=Y$ and ranges from 0 to 3, and $(\Sigma_k \gamma_k)=Z$ and ranges from 0 to 2, (hereinafter referred to as "$MBE_2O_5$" compounds).

Another embodiment of the present invention satisfies the generally formula

  Formula 2 wherein $M^1$ is a mono-valent metal ion; and wherein $(\Sigma_i \alpha_i)=X=6$; and yet another embodiment of the present invention satisfies the general formula

  Formula 3 wherein $M^2$ is a di-valent metal ion; and wherein $(\Sigma_j \beta_j)=Y=3$. another embodiment of the present invention satisfies the general formula

  Formula 4 wherein $M^3$ is a tri-valent metal ion; and wherein $(\Sigma_k \gamma_k)=Z=2$.

Mono-, di-, and tri-valent metal ions, $M^1$, $M^2$, and $M^3$ that are suitable for forming compounds satisfying the general formula are preferably independently selected from the group consisting of Groups IA, IIA, IIB, IIIA, VA, and lanthanide metals, however other mono-, di-, and tri-valent cations may be used so long as the material has a non-centrosymmetric atomic arrangement. The best results are achieved by independently selecting $M^1$ from the group consisting of potassium, rubidium, and cesium; $M^2$ from the group consisting of strontium, barium, and lead; $M^3$ from the group consisting of yttrium, lanthanum, cerium, gadolinium, lutetium, bismuth, praseodymium, neodymium, samarium, europium, terbium, dysprosium, holmium, erbium, thulium, and ytterbium. Examples of nonlinear optical materials satisfying the general formula include, but are not limited to, $Na_6Be_2O_5$, $Li_6Be_2O_5$, $Na_3Li_3Be_2O_5$, and $K_3Na_3Be_2O_5$.

The there are several merits of these materials, among which are that they overcome, to a great extent the strong layer habit, and appear to have no apparent plane of cleavage, and have better mechanical properties, in comparison with KBBF, and they overcome shortcomings in NLO properties of BBO, such as absorption edge, birefringence, and phase-matchable range.

$MBE_{2O5}$ has a great potential to replace BBO crystal in many NLO applications, such as data storage, sub-micron photolithography for high-density semiconductor device fabrications, laser chemistry (especially molecule splicing), laser spectroscopes, harmonic generation devices, and optical parametric and amplifier devices as well.

II. General Method for Making NLO Materials

A number of methods, now known or hereinafter developed, can be used to synthesize compounds that satisfy Formula 1 through Formula 4. In general, and without limitation, compounds satisfying Formula 1 through Formula 4 have been synthesized by heating appropriate molar amounts of starting materials to a temperature sufficient to form the nonlinear optical materials. First, a mixture is formed comprising appropriate molar amounts of a source of $M^1/M^2/M^3$ and beryllium oxide. The mixture is then ground in a mortar and pestal, heated to a first temperature that generally about 525° C. The mixture is then cooled to room temperature and re-ground, heated a second time to a second temperature higher than the first temperature, such as to a temperature of about 625° C., cooled to room temperature, re-ground and heated to a final temperature of about 725° C. This final heating step continued for a period of time sufficient to form a single-phase product.

Another method by which the compositions of the present invention may be produced is by merely mixing stoichiometric amounts of starting materials and heated to a temperature necessary to form a single phased product, for example 600° C.

Yet another method by which the compositions of the present invention may be produced is using a sol-gel type method, such as mixing soluble salts of the metals and beryllium into a solution and allowing the solvent and/or reaction by-product to be removed from the solution.

Still yet other methods by which the compositions of the present invention may be produced is using chemical vapor deposition, molecular beam epitaxy, and other like methods.

III Working Examples

The following examples describe particular embodiments of the present invention. These examples should be interpreted as being exemplary of the invention only, and not to limit the invention to the specific features discussed therein. Examples 1–6 describe particular processes used to synthesis various compounds satisfying Formula 1 through Formula 3.

EXAMPLE 1

$Na_6Be_2O_5$

This example describes the synthesis of $Na_6Be_2O_5$, Formulae 1 and 2. The entire sample preparation procedure was performed in a fume hood with a HEPA filter. Sodium carbonate ($Na_2CO_3$) having a purity of greater than 99.9% and beryllium oxide (BeO) having a purity of approximately 99.98%, were obtained from commercial vendors, such as Alpha Chemicals and Aesar. A 20 g sample was formed comprising a mixture of about 54 mole % $Na_2CO_3$ and about 46 mole % BeO. The sample was ground using a mortar and pestal for about 10 minutes and placed in a ceramic crucible (40 ml) and heated first to 525° C. for about one hour and removed from the oven to room temperature, reground for about 5 minutes, placed in the crucible, and heated to 625° C. for about one hour, followed by regrinding and heating a third time to 725° C. for about 12 hours to form a single-phase product.

Single crystals of $Na_6Be_2O_5$ were then grown, by methods well known to one of ordinary skill in the arts, such as from a melt. A 15 gram sample prepared using similar methods to those described above, was placed in a 1 inch platinum crucible and heated to a temperature that was 25° C. above the melting point of the sample for about 14 hours and cooled to a temperature of 620° C. at a cooling rate of about 0.5° C./hr. The sample was then cooled to room temperature at a cooling rate of about 50° C./hr. Colorless, transparent crystals of $Na_6Be_2O_5$ were obtained.

EXAMPLE 2

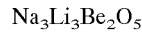

$Na_3Li_3Be_2O_5$

This example describes the synthesis of $Na_3Li_3Be_2O_5$, Formula 1. The starting materials were lithium carbonate ($Li_2CO_3$) and sodium carbonate ($Na_2CO_3$) having a purity of greater than 99.9% (Alpha-Aesar Chemicals), and beryllium oxide (BeO) having a purity of approximately 99.98% (Pfaltz-Bauer). A 5 g sample was formed comprising a mixture of about 29 mole % $Li_2CO_3$, 29 mole % $Na_2CO_3$, and about 42 mole % BeO. The sample was ground using a mortar and pestal for about 10 minutes and placed in a ceramic crucible (10 ml) and heated first to 550° C. for about 12 hours then removed from the oven to room temperature. Sample was then reground for about 5 minutes, placed in the crucible, and heated to 680° C. for about two hours, followed by regrinding and heating a third time to 800° C. for about 2 hours to form a single-phase product. This example demonstrates that a mixed metal species can be formed.

EXAMPLE 3

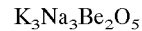

$K_3Na_3Be_2O_5$

This example describes the synthesis of $K_3Na_3Be_2O_5$, Formula 1. The starting materials were sodium carbonate ($Na_2CO_3$) and potassium carbonate ($K_2CO_3$) having a purity of greater than 99.9% (Alpha-Aesar Chemicals), and beryllium oxide (BeO) having a purity of approximately 99.98% (Pfaltz-Bauer). A 5 g sample was formed comprising a mixture of about 29 mole % $K_2CO_3$, 29 mole % $Na_2CO_3$, and about 42 mole % BeO. The sample was ground using a mortar and pestal for about 10 minutes and placed in a ceramic crucible (10 ml) and heated first to 550° C. for about 12 hours then removed from the oven to room temperature. Sample was then reground for about 5 minutes, placed in the crucible, and heated to 680° C. for about two hours, followed by regrinding and heating a third time to 800° C. for about 2 hours to form a single-phase product. This example also demonstrates that a mixed metal species can be formed.

EXAMPLE 4

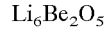

$Li_6Be_2O_5$

This example describes the synthesis of $Li_6Be_2O_5$, Formulae 1 and 2. The entire sample preparation procedure was performed in a fume hood with a HEPA filter. Lithium carbonate ($Li_2CO_3$) having a purity of greater than 99.9% and beryllium oxide (BeO) having a purity of approximately 99.98%, were obtained from commercial vendors, such as Aesar, and Pfaltz-Bauer. A 20 g sample was formed comprising a mixture of about 54 mole % $Li_2CO_3$ and about 46 mole % BeO. The sample was ground using a mortar and pestle for about 10 minutes and placed in a ceramic crucible (40 ml) and heated first to 525° C. for about one hour and removed from the oven to room temperature, reground for about 5 minutes, placed in the crucible and heated to 650° C. for about 12 hours to form a single-phase product.

EXAMPLE 5

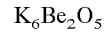

$K_6Be_2O_5$

This example describes the synthesis of $Na_6Be_2O_5$, Formulae 1 and 2. The entire sample preparation procedure was performed in a fume hood with a HEPA filter. Potassium carbonate ($K_2CO_3$) having a purity of greater than 99.9% and beryllium oxide (BeO) having a purity of approximately 99.98%, were obtained from commercial vendors, such as Alpha Chemicals and Aesar. A 20 g sample was formed comprising a mixture of about 55 mole % $K_2CO_3$ and about 45 mole % BeO. The sample was ground using a mortar and pestle for about 10 minutes and placed in a ceramic crucible (40 ml) and heated first to 525° C. for about one hour and removed from the oven to room temperature, reground for about 5 minutes, placed in the crucible and heated to 625° C. for about one hour, followed by regrinding and heating a third time to 725° C. for about 12 hours to form a single-phase product.

EXAMPLE 6

$Cs_6Be_2O_5$

This example describes the synthesis of $Cs_6Be_2O_5$, Formulae 1 and 2. The entire sample preparation procedure was performed in a fume hood with a HEPA filter. Cesium carbonate ($Cs_2CO_3$) having a purity of greater than 99.9% and beryllium oxide (BeO) having a purity of approximately 99.98%, were obtained from commercial vendors, such as Alpha Chemicals and Aesar. A 20 g sample was formed comprising a mixture of about 55 mole % $Cs_2CO_3$ and about 45 mole % BeO. The sample was ground using a mortar and pestle for about 10 minutes and placed in a ceramic crucible (40 ml) and heated first to 525° C. for about one hour and removed from the oven to room temperature, reground in the mortar and pestle for about 5 minutes, placed in the crucible and heated to 625° C. for about one hour, followed by regrinding and heating a third time to 725° C. for about 12 hours to form a single-phase product.

Crystal Growth

Crystals were grown from a melt once the desired compounds were obtained by the general method outlined above. To grow the crystals, the compounds were heated to a temperature above the melting point of the respective compounds, and then slowly cooled at a rate of about 0.5° C./hr to a first temperature of about 620–725° C. The material was then further cooled to room temperature at a faster cooling rate, such as about 50–60° C./hr. Transparent crystals of nonlinear optical materials satisfying Formula 1 through Formula 3 were obtained by this process.

Crystal Structure Analysis

Critical to the present invention, the compositions must have a non-centrosymmetric arrangement in order to produce the nonlinear optical effects. In the case of a crystalline material, this would be satisfied by forming in non-centrosymmetric space groups. Also in the case of vitreous or glassy materials, the local, or short range order must exhibit a non-centrosymmetric configuration.

Non-Linear Optical Properties

The present invention comprises materials as described above used to created devices with non-linear optical properties, such as harmonic light energy. A NewWave Nd:YAG pulsed laser (100 mJ, 7 ns pulse width, 20 Hz repetition rate) was used as a light source of 1064 nm ($2.818 \times 10^{14}$ Hz) laser light. Samples from Examples 1–6 were separately ground in mortar and pestal and filtered to a nominal particle size of 80 mesh using NIST sieves. The samples were then pressed into pellets of about 1 mm thick in a double-screw IR pellet press, which also served as the sample holder. Each of these samples was separately placed into the 1064 nm beam of the above described laser. Second harmonic light energy emerged as 532 nm ($5.635 \times 10^{14}$ Hz) light, frequency-converted by the samples indicating that they are NLO crystals. This converted light was filtered for 532 nm transmission, passed through a neutral density (2.0) filter and thereby was directed onto a photomultiplier tube. The signal from the photomultiplier tube was converted to a voltage signal and fed into a Tektronix oscilloscope. After approximately one minute, the average signal was recorded. Crystalline $KH_2PO_4$ (KDP), treated in an identical manner, served as the standard.

Data generated by practicing the steps stated above, Table 1, shows that materials satisfying Formula 1 through Formula 4 function as nonlinear optical materials. More specifically, second harmonic light energy emerging from crystals made according to the present invention had frequency conversion intensities similar to the standard, KDP. The above method provides a qualitative indication of the overall second harmonic conversion efficiency.

TABLE 1

Second Harmonic Generation Efficiency of the Beryllate Materials According to the Present Invention.

| Sample | Relative SHG Efficiency (normalized to KDP) |
|---|---|
| $Li_6Be_2O_5$ | 1.0 |
| $Na_3Li_3Be_2O_5$ | 1.0 |
| $Na_6Be_2O_5$ | 1.0 |
| $K_3Na_3Be_2O_5$ | 1.0 |
| $K_6Be_2O_5$ | 0.7 |

TABLE 1-continued

Second Harmonic Generation Efficiency of the Beryllate Materials According to the Present Invention.

| Sample | Relative SHG Efficiency (normalized to KDP) |
|---|---|
| $Cs_6Be_2O_5$ | 0.7 |
| $KH_2PO_4$ | 1.0 |

As can be seen, the materials produced relative SHG efficiencies equivalent to that of the KDP standard—a significant result.

IV. Nonlinear Optical Devices

The above example is only a simplest example of use of $MBE_2O_5$ in NLO applications. The $MBE_2O_5$ material can also be used to perform other nonlinear applications, such as sum-frequency or difference-frequency outputs, and optical switching. Thus, the present invention also concerns devices that use nonlinear optical materials. These devices take advantage of the fact that the wavelength of the light produced by the nonlinear optical material is some value times the light entering the material. Such devices would include a light source and a nonlinear optical material optically coupled to the light source. Lasers, such as a Nd:YAG, Ti:Sapphire, and diode lasers, are examples of light sources likely to be used with such devices. Herein, "optically coupled" means that the light emitted by the light source interacts with the nonlinear optical material in a nonlinear fashion. This might simply mean that the output from the light source is directed onto the nonlinear optical material. Alternatively, the device may include additional structural features, such as fiber optic cables and focusing lenses, so that the light emitted by the light source is transmitted efficiently to and focused on the nonlinear optical material. Moreover, the device may include additional components that are needed to perform a particular function, such as a mount for mounting the nonlinear optical material, a unit to maintain the material at a specific temperature or other environmental conditions, optics for controlling beam direction and/or quality, and possibly even a photodetector for detecting light emitted by the light source and/or the nonlinear optical material. A schematic drawing of an optical system for third harmonic generation that utilizes a crystal of a nonlinear optical material is shown in FIG. 1.

Other devices include optical parametric oscillators (OPO). Optical parametric generation is a nonlinear optical process that uses a nonlinear optical crystal to convert single photon energy emitted by a laser into two new energies, termed signal and idler photon energies. The signal photon has a higher frequency than the idler photon. The sum of the two frequencies equals that of the pump laser frequency. Phase-matching conditions within the nonlinear crystal determine the ratio of the frequencies. Changing the phase-matching conditions alters the splitting ratio, thereby simultaneously tuning the signal and idle outputs. This allows an OPO to produce widely tunable coherent light.

The preferred embodiment of the invention is described above in the Drawing and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A non-centrosymmetric composition comprising the general formula $(\Sigma_i M_{\alpha i}^1)(\Sigma_j M_{\beta j}^2)(\Sigma_k M_{\gamma k}^3)Be_2O_5$ for use in a non-linear optics application, wherein $M^1$, $M^2$, and $M^3$ are mono-, di- and tri-valent metal ions respectively; and wherein $(\Sigma_i \alpha_i)=X$ and ranges from 0 to 6, $(\Sigma_j \beta_j)=Y$ and ranges from 0 to 3, and $(\Sigma_k \gamma_k)=Z$ and ranges from 0 to 2.

2. The composition according to claim 1 wherein X=6, Y=0, Z=0, and the general formula becomes $(\Sigma_i M_{\alpha i}^1)Be_2O_5$.

3. The composition according to claim 1 wherein X=0, Y=3, Z=0, and the general formula becomes $(\Sigma_j M_{\beta j}^2)Be_2O_5$.

4. The composition according to claim 1 wherein X=0, Y=0, Z=2, and the general formula becomes $(\Sigma_k M_{\gamma k}^3)Be_2O_5$.

5. The composition according to claim 1 wherein the composition is a material selected from the group consisting of a crystalline material, a glassy material, an oligomeric material, and a polymeric material.

6. The composition according to claim 2 wherein the composition is a material selected from the group consisting of a crystalline material, a glassy material, an oligomeric material, and a polymeric material.

7. The composition according to claim 3 wherein the composition is a material selected from the group consisting of a crystalline material, a glassy material, an oligomeric material, and a polymeric material.

8. The composition according to claim 4 wherein the composition is a material selected from the group consisting of a crystalline material, a glassy material, an oligomeric material, and a polymeric material.

9. A method for making a non-centrosymmetric compound with the general formula $(\Sigma_i M_{\alpha i}^1)(\Sigma_j M_{\beta j}^2)(\Sigma_k M_{\gamma k}^3)Be_2O_5$ for use in a non-linear optics application, wherein $M^1$, $M^2$ and $M^3$ are mono-, di- and tri-valent metal ions respectively; and wherein $(\Sigma_i \alpha_i)=X$ and ranges from 0 to 6, $(\Sigma_j \beta_j)=Y$ and ranges from 0 to 3, $\Sigma_k \gamma_k=Z$ and ranges from 0 to 2 comprising the steps of a. forming a mixture comprising from about 0 to about 99 mole % of at least one source of $M^1$, from about 0 to about 99 mole % of at least one source of $M^2$, from about 0 to about 99 mole % of at least one source of $M^3$, and from about 1–99 mole % of beryllium oxide; and b. heating the mixture to a temperature sufficient to form the nonlinear optical material.

10. The method according to claim 9 wherein the step of heating further comprises: heating the mixture to a first temperature of at least 500° C.; cooling the mixture; comminuting the mixture; and heating the mixture to a second temperature that is higher than the first temperature.

11. The method according to claim 9 wherein X=6, Y=0, Z=0, and the general formula becomes $(\Sigma_i M_{\alpha i}^1)Be_2O_5$.

12. The method according to claim 10 wherein X=6, Y=0, Z=0, and the general formula becomes $(\Sigma_i M_{\alpha i}^1)Be_2O_5$.

13. The method according to claim 9 wherein X=0, Y=3, Z=0, and the general formula becomes $(\Sigma_j M_{\beta j}^2)Be_2O_5$.

14. The method according to claim 10 wherein X=0, Y=3, Z=0, and the general formula becomes $(\Sigma_j M_{\beta j}^2)Be_2O_5$.

15. The method according to claim 9 wherein X=0, Y=0, Z=2, and the general formula becomes $(\Sigma_k M_{\gamma k}^3)Be_2O_5$.

16. The method according to claim 10 wherein X=0, Y=0, Z=2, and the general formula becomes $(\Sigma_k M_{\gamma k}^3)Be_2O_5$.

17. The method according to claim 9 wherein a flux material is added to the mixture prior to the step of heating the mixture, said flux material aids in the formation of the material.

18. The method according to claim 10 wherein a flux material is added to the mixture prior to the step of heating the mixture, said flux material aids in the formation of the material.

19. A method for making a non-centrosymmetric compound with the general formula $(\Sigma_i M_{\alpha i}^1)(\Sigma_j M_{\beta j}^2)(\Sigma_k M_{\gamma k}^3)Be_2O_5$ for use in a non-linear optics application, wherein $M^1$, $M^2$, and $M^3$ are mono-, di- and tri-valent metal ions respectively; and wherein $(\Sigma_i \alpha_1)=X$ and ranges from 0 to 6, $(\Sigma_j \beta_j)=Y$ and rages from 0 to 3, and $(\Sigma_k \gamma_k)=Z$ and ranges from 0 to 2 using a method selected from the group consisting of sol-gel type synthesis, chemical vapor deposition synthesis, and molecular beam epitaxy.

20. A non-centrosymmetric compound of formula selected from the group consisting of $Li_6Be_2O_5$, $Na_3Li_3Be_2O_5$, $Na_6Be_2O_5$, $K_3Na_3Be_2O_5$, $K_6Be_2O_5$, and $Cs_6Be_2O_5$.

21. A non-centrosymmetric composition comprising the general formula $(\Sigma_i M_{\alpha i}^1)(\Sigma_{j\ M\beta j}^2)(\Sigma_k M_{\gamma k}^3)Be_2O_5$ for use in a non-linear optics application, wherein $M^1$, $M^2$ and $M^3$ are mono-, di- and tri-valent metal ions respectively; and wherein $(\Sigma_i \alpha_i)=X$ and ranges from 0 to 6, $(\Sigma_j \beta_j)=Y$ and ranges from 0 to 3, $(\Sigma_k \gamma_k)=Z$ and ranges from 0 to 2 for use in harmonic generation devices, optical parameter devices, optical amplifier devices, optical wave guide devices or optical switch devices.

22. The composition according to claim 21 wherein X=6, Y=0, Z=0, and the general formula becomes $(\Sigma_i M_{\alpha i}^1)Be_2O_5$.

23. The composition according to claim 21 wherein X=0, Y=3, Z=0, and the general formula becomes $(\Sigma_j M_{\beta j}^2)Be_2O_5$.

24. The composition according to claim 21 wherein X=0, Y=0, Z=2, and the general formula becomes $(\Sigma_k M_{\gamma k}^3)Be_2O_5$.

* * * * *